United States Patent
Bailey et al.

(10) Patent No.: US 10,659,448 B2
(45) Date of Patent: *May 19, 2020

(54) OUT-OF-BAND REMOTE AUTHENTICATION

(71) Applicant: Intel Corporation, Santa Clara, CA (US)

(72) Inventors: Abdul M. Bailey, Tigard, OR (US);
Ned M. Smith, Beaverton, OR (US);
Atul Gupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,102

(22) Filed: Feb. 26, 2019

(65) Prior Publication Data

US 2019/0297067 A1    Sep. 26, 2019

Related U.S. Application Data (63) Continuation of application No. 13/976,063, filed as application No. PCT/US2011/054176 on Sep. 30, 2011, now Pat. No. 10,250,580.

(51) Int. Cl.
*H04L 29/06* (2006.01)
*H04W 12/06* (2009.01)
*H04L 9/32* (2006.01)

(52) U.S. Cl.
CPC .......... *H04L 63/08* (2013.01); *H04L 9/3215* (2013.01); *H04L 63/18* (2013.01); *H04W 12/06* (2013.01)

(58) Field of Classification Search
None
See application file for complete search history.

(56) References Cited

U.S. PATENT DOCUMENTS 7,793,342 B1 * 9/2010 Ebrahimi ............ H04L 63/0281
713/166
2006/0015358 A1   1/2006 Chua
(Continued)

FOREIGN PATENT DOCUMENTS

| CN | 101978652 | 2/2011 |
| CN | 102195930 | 9/2011 |

(Continued)

OTHER PUBLICATIONS

Marvin A. et al. ("Distributed Authentication in Kerberos Using Public Key Cryptography, In: Symposium on Network and Distributed System Security," IEEE Computer Society Press, pp. 134-141, 1997.*

(Continued)

*Primary Examiner* — Simon P Kanaan
(74) *Attorney, Agent, or Firm* — Trop, Pruner & Hu, P.C.

(57) ABSTRACT

In an embodiment a single user authentication event, performed between a trusted path hardware module and a service provider via an out of band communication, can enable a user to transparently access multiple service providers using strong credentials that are specific to each service provider. The authentication event may be based on multifactor authentication that is indicative of a user's actual physical presence. Thus, for example, a user would not need to enter a different retinal scan to gain access to each of the service providers. Other embodiments are described herein.

18 Claims, 4 Drawing Sheets

(56) References Cited

U.S. PATENT DOCUMENTS

| | | |
|---|---|---|
| 2007/0192326 A1 | 8/2007 | Angal |
| 2007/0245408 A1 | 10/2007 | Holovacs |
| 2009/0259848 A1* | 10/2009 | Williams ............ H04L 63/0838 713/168 |
| 2009/0327724 A1 | 12/2009 | Shah et al. |
| 2011/0078799 A1* | 3/2011 | Sahita ..................... G06F 21/53 726/26 |
| 2011/0252153 A1 | 10/2011 | Vlodaysky |
| 2012/0331538 A1 | 12/2012 | Yuan et al. |
| 2013/0080764 A1 | 3/2013 | Khosravi |

FOREIGN PATENT DOCUMENTS

| | | |
|---|---|---|
| WO | 03073242 | 9/2003 |
| WO | 2010127263 | 11/2010 |

OTHER PUBLICATIONS

European Patent Office, European Search Report dated Nov. 4, 2019 in European patent application No. 19202135.0-1218, 9 pages total.
State Intellectual Property Office, People's Republic of China, First Office Action dated Apr. 12, 2016 in Chinese Patent Application No. 201180073814.2.
European Patent Office, "Communiction (Extended European Search Report)," dated May 28, 2015, in application No. EP 11 87 3252.8, 8 pages.
Menezes, Vanstone, Oorschot, "Handbook of Applied Cryptography," 1997, CRC Press LLC, USA, XP001525010, 42 pages.
State Intellectual Property Office, Office Action dated Feb. 22, 2018 in Chinese Patent Application No. 201180073814.2.
European Patent Office, Communication pursuant to Article 94(3)EPC dated Jun. 21, 2018 in European patent application No. 11 873 252.8, five pages.
State Intellectual Property Office, Decision of Reexamination dated Sep. 29, 2018 in Chinese patent application No. 201180073814.2, 19 pages.
Brickell, Ernie, "Enhanced Privacy ID: A Remote Anonymous Attestation Scheme for Hardware Devices", Intel Technology Journal, vol. 13, Issue 2, 2009, pp. 96-111.
International Searching Authority, "International Search Report and the Written Opinion of the International Searching Authority," dated Mar. 19, 2012, in International application No. PCT/US2011/054176.
Marvin A Sirbu et al. "Distributed Authentication in Kerberos Using Public Key Cryptography," In: Symposium on Network and Distributed System Security, San Diego, California: IEEE Computer Society Press, 1997, pp. 134-141.
Korean Intellectual Property Office, "Notice of Preliminary Rejection," in Korean Patent Application No. 10-2014-7008347 dated Mar. 2, 2015.
Siribu, Marvin et al, "Distributed Authentication in Kerberos Using Public Key Cryptography" Institute of Electrical and Electronics Engineers, Pittsburgh, PA, 8 pages.
State Intellectual Property Office of the People's Republic of China, Office Action dated Mar. 3, 2017, in Chinese Patent Application No. 201180073814.2.
State Intellectual Property Office of The People's Republic of China, Second Office Action dated Sep. 9, 2016, in Chinese Patent Application No. 201180073814.2.

* cited by examiner

OUT-OF-BAND REMOTE AUTHENTICATION

CROSS-REFERENCE TO RELATED APPLICATIONS

This application is a continuation of U.S. patent application Ser. No. 13/976,063, filed Sep. 11, 2013, and entitled "Out-of-Band Remote Authentication", which is a § 371 National Stage Entry of International Application No. PCT/US2011/054176, filed Sep. 30, 2011, and entitled "Out-of-Band Remote Authentication". The content of each of the above applications is hereby incorporated by reference.

BACKGROUND

User attestation and authentication conventionally requires inputting user credentials via an operating system (OS) and/or software (i.e., via in-band communications). For example, to log into a service provider's (SP) cloud-based email service the user must enter a username and password via an OS and browser. Reliance on such passwords, however, may be insufficient for maintaining secure computing practices.

For example, entry of password information via in-band communications with an OS or software module leaves the system exposed to security threats (e.g., key loggers, man-in-the-middle attacks). Even strong passwords, such as hardware or software One Time Passwords (OTP) which are theoretically supposed to verify the user access request actually originates from a physical person, are problematic due to the in-band nature of how the password is communicated (i.e., such a password is still susceptible to key loggers and the like). Furthermore, even if such passwords are not intercepted, these same passwords are weak because Trojans, viruses, and worms may pose as a physical person and spread across multiple endpoints. As yet another problem with most passwords, humans typically cannot recall unique, long, otherwise strong passwords for every internet service they subscribe to. As a result, to reduce the burden of recall many users reuse the same password across multiple sites. Even if users use several different passwords, such passwords are often short, predictable and otherwise weak and equally ineffective as the above options.

To increase the strength of passwords, identity management services implement multi-factor authentication (MFA) which includes, for example, retinal scanning, fingerprint scanning, and the like. Such credentials are unique, do not need to be memorized by a user, and are generally considered strong for passwords. However, the actual real world implementation of such credentials can be problematic when viewed in a realistic setting where, for example, a user wants to interact with multiple service providers.

Specifically, identity management services implement MFA by testing corresponding MFA policies on the server—not on the client. Thus, proof of user presence is established externally to the platform (e.g., by hardware token on the client-side and/or by forwarding authentication minutia to the server). This may be because the platform itself may not have attestation capability or, if it does the trusted path mechanism (e.g., Trusted Platform Module (TPM)) may be external to the attestation capability.

Consequently, because the status of the user's authentication is held by the server (and not on the client), if a different service provider (on a different server) wants to know the authentication status of the user there are two options. First, the user may have to re-authenticate by, for example, again submitting a retinal scan. This can be burdensome to a user, especially when implemented with MFA credentials (e.g., taking multiple retinal scans). Second, the two servers must federate the user's identity and implement backend protocols to track the user's authentication status. This approach has privacy implications that the user is not able to directly control, which again decreases security. Neither option is optimal.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

In an embodiment a single user authentication event, performed between a trusted path hardware module and a service provider via an out of band communication, can enable a user to transparently access multiple service providers using strong credentials that are specific to each service provider. The authentication event may be based on multifactor authentication that is indicative of a user's actual physical presence. Thus, for example, a user would not need to enter a different retinal scan to gain access to each of the service providers.

Figure 1:
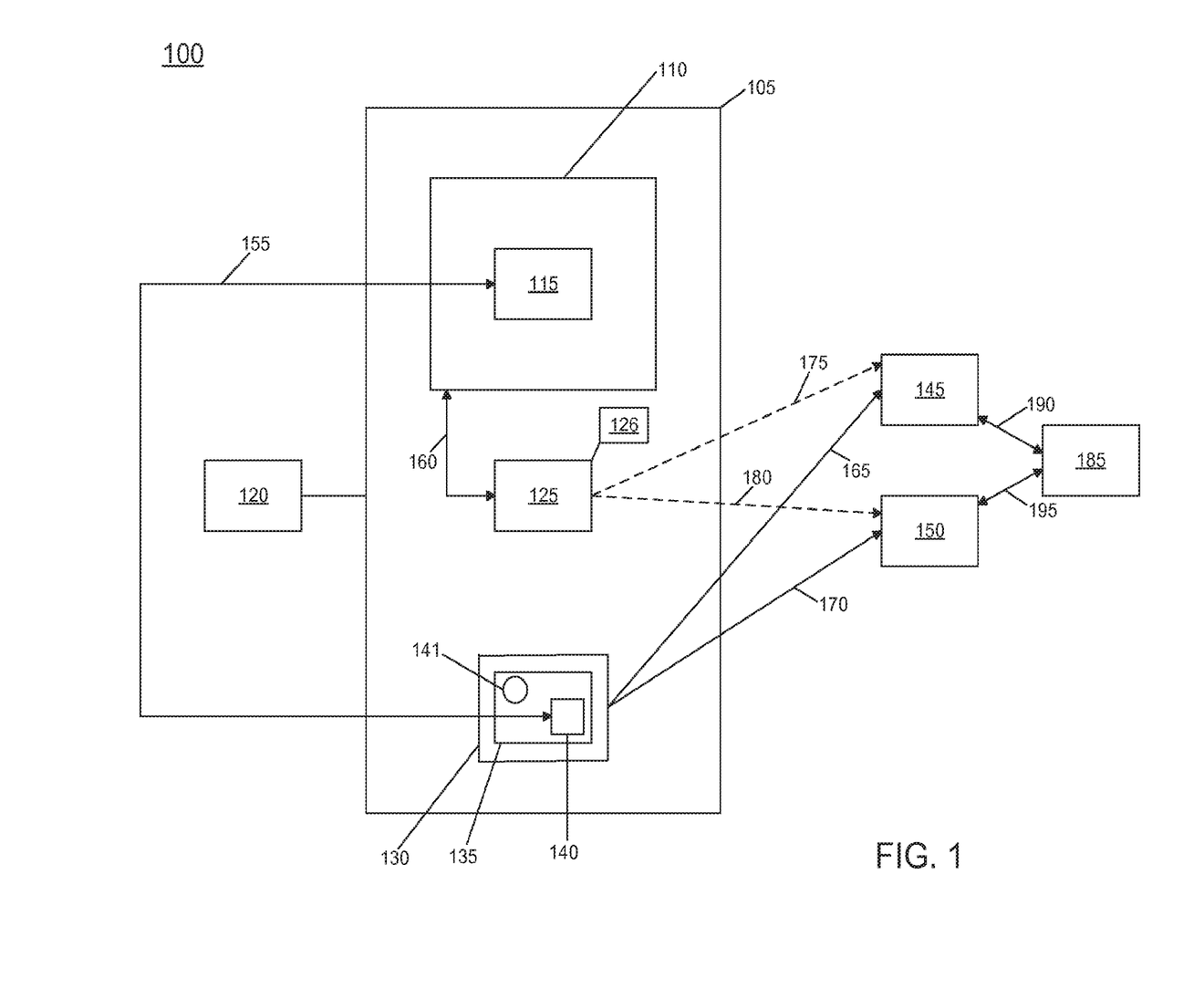
FIG. 1 includes a system in an embodiment of the invention.

FIG. 1 includes system 100 in an embodiment of the invention. In general, platform 105 may include a mobile computing device, laptop, netbook, tablet, personal computer, personal digital assistant, mobile phone, smart phone, portable media player, and the like. Platform 105 may include central processing unit (CPU) 125 and System-on-a-Chip (SOC) 130.

SOC 130 may include or couple to trusted path (TP) mechanism 135. For example, and without limitation, TP mechanism may include or implement Intel® Active Management Technology (Intel® AMT), which allows one to query, restore and protect devices remotely, even when they are powered off. AMT allows access to platform 105 independent of OS 126, application software 110, and CPU 125 (i.e., via out-of-band (OOB) communication). In addition, SOC 130 includes security mechanisms to ensure the communications linking platform 105 and its external environment are secure. In an embodiment, TP mechanism 130 may specifically include, for example and without limitation, an Intel® Management Engine (ME) 135 that runs AMT firmware services and applications. ME 135 may be a microcontroller implemented system to enforce policies received from a remote agent (e.g., independent software vendor (ISV), original equipment manufacturer (OEM), information technology (IT) department, SP, etc.) via a coupled network with regard to communicating with other portions of platform 105 (e.g., memory). For example, a system startup (boot) policy may be downloaded to ME 135 from an OEM. ME 135, in turn, evaluates the policy against local user settings credentials in, for example, a Trusted Platform Module (TPM), and the like. ME 135 may subsequently provide access to other portions of platform 105 (e.g., memory) if the policy conditions are in conformance. Further details regarding ME 135 are available in, for example and without limitation, U.S. Pat. Nos. 7,603,707 and 7,930,728 and "Advanced Security Design Aspects of i5 and i7 Processors (Intel® AMT): WHITE PAPER 2nd generation Intel® Core™ i5 and i7 Processors Intel® vPro™ Technology Embedded Computing" available at http://download.intel.com/embedded/technology/325644.pdf and more generally at www.intel.com. As alluded to above, TP mechanism 135 may include a TCP/IP network stack that is independent of host OS 126 network stack, thereby allowing for out-of-band (OOB) network connectivity.

In an embodiment, platform 105 includes a credential vault (CV) 140, which is further included in TP mechanism 135. CV 140 generates and remembers unique, strong, multi-factor credentials.

Figure 2:
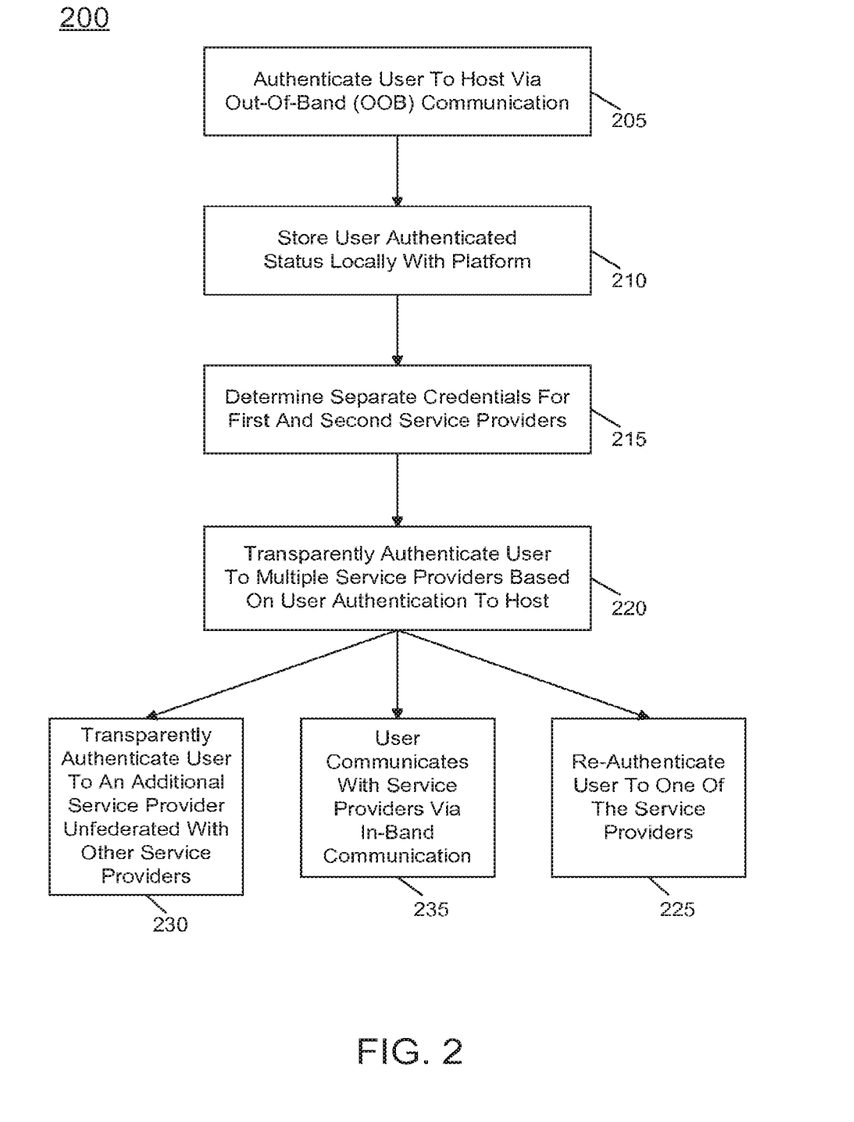
FIG. 2 includes a method in an embodiment of the invention.

FIG. 1 is discussed further in conjunction with FIG. 2. FIG. 2 includes a method in an embodiment of the invention. Method 200 uses a single user authentication event to enable user access to multiple SP's, using SP specific credentials (e.g., a unique, strong credential for each SP), to enable secure communication with platform 105. While FIG. 2 is discussed in concert with system 100 of FIG. 1, embodiments of the method are not limited to implementation with such a system.

In block 205 a user is authenticated to host 105, via an OOB communication (e.g., via OOB channel 155), to determine a user authentication status. Considering the OOB capacity of SOC 130 and consequent independence from booting of OS 126, the user authentication of block 205 may occur pre-system startup (i.e., pre-boot or before OS 126 is fully booted) and/or post-system startup (i.e., post-boot or after OS 126 is fully booted). Further in consideration of the OOB communication capacity, the authentication may be based in part on entry of information from the user via sprite 115, a graphical overlay (e.g., protected audio/visual path (PAVP) sprite), which enables an OOB communication independent of software application 110 and OS 126. Authentication information may include strong multi-factor credentials entered via unit 120 (e.g., fingerprint scanner, retinal scanner, voice recognition, and the like). Such information may be included in conjunction with or independent of information entered via sprite 115. Embodiments are not limited to use of any specific form of credentials or combination of credentials.

Regarding sprite 115, in an embodiment host 126 or one of the SPs may supply a bitmap of the PAVP sprite so the user experience is consistent with an OS user interface look and feel. This bitmap may be transmitted via OOB secure channels 165 or 170, which are described further below.

More specifically regarding OOB communications, the user is authenticated using a "trusted path" mechanism (e.g., ME) that establishes a secure channel between the human-interface device (e.g., fingerprint scanner, trusted keyboard) and CV 140. CV 140 logic runs on a microcontroller in chipset 130 that is physically isolated from the host CPU, memory, and input/output (I/O) devices. Hence, a communication to chipset 130 need not "go through" OS 126 or software 110. Instead, the communication may by "out of band" and bypass OS 126 and software 110 to communicate directly to chipset 130.

User authentication devices may be assigned to CV 140 (at least temporarily) to perform trusted-path user authentication. For example, PAVP is a resource that is partitioned between host 105 and chipset 130. CV 140 uses the chipset PAVP resource so as not to conflict with host 105 using PAVP. Each authentication device (e.g., fingerprint scanner) may have to either partition the resource allocating a partition to the chipset exclusively or may devise a sharing scheme that allows the chipset to "steal" the device from the host and "return" it. Many human interface devices are stateless in this regard so stealing and returning does not result in program errors.

Returning to FIG. 2, in block 210 system 100 maintains the user authentication status (determined in block 205) locally on host 105, the significance of which is discussed further below.

In block 215 system 100, transparently to the user, determines (e.g., generates or selects) credentials to authenticate the user to SP 145 and other credentials, unequal to the credentials for SP 145, to authenticate the user to SP 150. SP 145 may include a banking cloud service and SP 150 may include an email cloud service. SP 145 may be hosted on a server separate from another server that hosts SP 150. In an embodiment, CV 140 is used to generate the credentials of block 210. CV 140 generates and remembers unique, strong, multi-factor credentials. TP module 135 (e.g., ME) implements CV 140, which may consist of a Java virtual machine (JVM) with one or more Java applets and cryptographic keys, protected by ME firmware and hardware, and a default vault authentication policy (described further below).

In block 220, based on the credentials generated (e.g., via random number generator) or selected in block 215, system 100 transparently (to the user) authenticates the user to SP 145 via an OOB communication (e.g., via OOB communication channel 165). Also in block 220, based on the credentials determined in block 215, system 100 transparently (to the user) authenticates the user to SP 150 via another OOB communication (e.g., via OOB communication channel 170).

Thus, via blocks 205, 210, 215, and 220 method 200 uses a single user authentication event (block 205) to transparently enable user access to multiple SP's (SP 145 and SP 150) using credentials specific to both SP 145 and SP 150. Furthermore, considering block 205 may be based on authentication indicative of a user's actual physical presence (e.g., retinal scan), platform 105 may deliver evidence of the user's physical presence to SP 145 and SP 150—relying upon a single retinal scan in block 205 but without need for additional independent scans for SP 145 and SP 150.

One embodiment includes block 225. In block 225 system 100 re-authenticates the user to SP 145 transparently to the user and via a supplemental OOB communication. For example, if a secure session between platform 105 and SP 145 eventually times out a re-authentication may occur without need for the user to again, for example, re-enter multi-factor credentials (based in part on the initial authentication that occurred in block 205). This re-authentication is more easily handled because in block 210, user authentication status was stored locally on platform 105 (e.g., included in TP module 135).

Also due in part to user authentication status being stored locally on platform 105, in block 230 the user can transparently (i.e., without again asking user for additional multi-factor credential input) access a third SP (not shown in FIG. 1). Thus, even if the third SP is not federated with either SP 145 or SP 150, the user authentication is local to platform 105 so the lack of federation is overcome.

In block 235, platform 105 may securely communicate with SP 145 and SP 150 via in-band communications such as, for example, respective channels 175, 180. Such channels include, for example, the internet. Based on prior blocks in method 200, granting the user access to the internet resource can now be done with trust that a real person is sitting behind a real authenticate platform.

Figure 3:
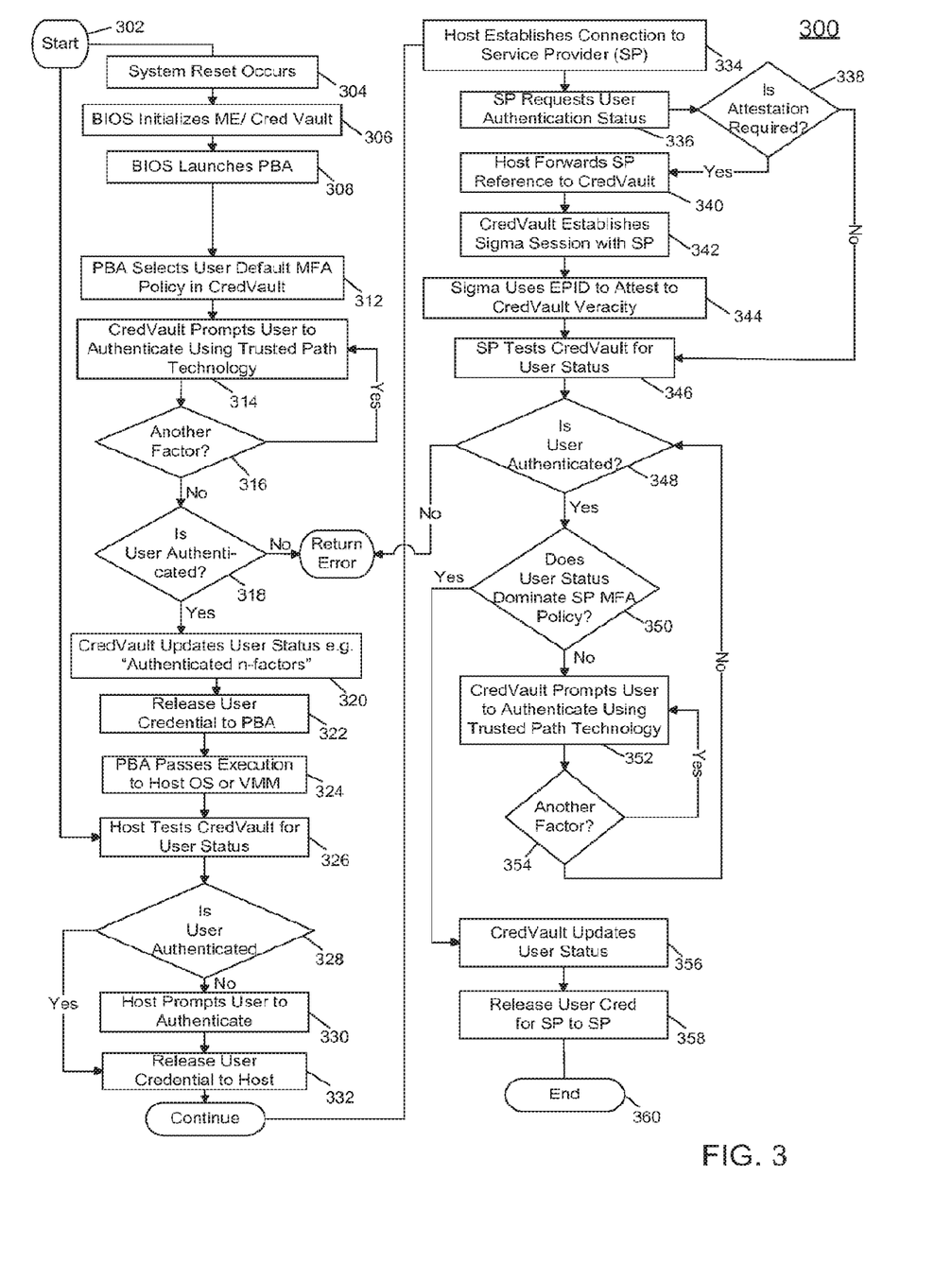
FIG. 3 includes a method in an embodiment of the invention.

FIG. 3 includes method 300 in an embodiment of the invention. The method begins in block 302 and is followed by system reset in block 304. In block 306 BIOS initializes a hardware security module, such as a ME in TP device 135 (which may include or couple to CV 140). In block 308 BIOS launches pre-boot authentication (PBA). In block 312, PBA selects a default MFA policy stored in CV 140. In blocks 314, 316 the user authenticates according to the number of factors dictated by the policy of block 312 (i.e., the process repeats addressing retinal scan, fingerprint scan, and so on until all required factors have been tested for). The authentication may proceed using trusted path technology such as ME 135 and AMT procedures. Block 318 determines whether the user is authenticated based on the testing done in block 314.

In block 320 CV 140 updates the user's status. As mentioned above, storing such information locally lessens the need for SPs hosted on disparate servers to federate with one another.

In block 322 the PBA releases the user credential to PBA. More specifically, CV 140 maintains (stores) "credentials" (e.g. passwords) that are replayed by the BIOS to unlock a hard disk drive (HDD), access a locked USB device, and the like. Rather than prompting the user to enter the password for each resource (e.g., HDD, USB device) being accessed, CV 140 stores all the passwords needed and authenticates the user once. This could be password based where the password the user supplies is different from the passwords vault 140 "releases" to the BIOS to do the actual HDD and USB device unlock operations.

In block 324 the PBA passes execution to the Host OS or VMM. In block 326, the host platform 105 tests CV 140 to determine whether the user status reflects authentication to the host. If not, the host may prompt the user for authentication (block 330) or eventually return an error and/or abort authentication. If yes, the user credential is released to the host (block 332). More specifically, Host OS 126 performs login operations and may have applications (e.g., email, file passwords, and the like) that are stored in CV 140. The host application can be written to store the password in CV 140 (rather than in a file that is vertically integrated by the application developer). Block 326 includes the test to determine if the user has previously authenticated (e.g., BIOS may have triggered a user authentication in order to unlock a HDD as explained in regards to block 322). If yes, then the user is not prompted again at OS login. Rather, the password in the vault is returned without bothering the user (again).

In block 334, the host may establish a connection to SP via an OOB communication channel Thus, in contrast to some conventional methodologies, the SP does not establish a secure communication authentication channel back to software 110 but instead, SP establishes an OOB communication channel with TP module 135. In an embodiment, TP module 135 may authenticate a certificate from the SP using a third party resource (e.g., VeriSign) and further communication with the SP may be based on this authentication.

In block 336 the SP may request the user's authentication status from platform 105. In block 338 a determination is made as to whether attestation is required. If no, the process advances to block 346. If yes, in block 340 host 105 forwards the SP reference to CV 140. In block 342, CV 140 establishes a secure OOB session (e.g., Sigma or Transport Layer Security (TLS) protocols) with the SP.

In block 344, the Sigma session may use a secure ID to attest to the CV 140 veracity. Such an ID may include, for example and without limitation, an Enhanced Privacy ID (EPID), which is a cryptographic scheme that enables the remote authentication of a hardware device while preserving the privacy of the device owner. In such a situation, one public key in the EPID scheme corresponds to multiple private keys. In an embodiment, an EPID may be a credential permanently embedded in TP module 135. As a result, EPID is a privacy sensitive platform identifier that allows a SP to trust the authorization status of platform 105 without also allowing the SP to collaborate with another SP regarding the user's authentication status. More information regarding EPID is located, in the least, in "Enhanced Privacy ID: A Remote Anonymous Attestation Scheme for Hardware Devices" published in Intel Technology Journal, Vol. 13, Issue 2, 2009. Embodiments do not necessarily require EPID or any other one public key/many private key scheme.

In greater detail regarding steps 340, 342, 344, when "releasing" a password to a remote party (e.g., service provider) the SP doesn't know if the password was protected in hardware of if it was exposed to attacks in the host OS. Attestation is a mechanism whereby the ME can prove to a remote party that it is indeed hardware that is protecting the password. Block 340 is sending a transport session handle to vault 140 that allows it to open a Sigma session (or other protected session) between vault 140 and the SP. A Sigma session may include a signed Diffie-Hellman key exchange protocol where the signature is performed using an EPID. A property of Sigma is that it includes attestation information. The attestation in one embodiment can be for the vault environment and that the password(s) contained within the vault. A hash of the password may be supplied in the attestation so the SP can compare the hash with the actual password that is released to the application later (e.g., see block 358)

Returning to method 300, in block 344 hardware attestation of CV 140 is achieved using EPID. This is at least in part based on unit 135 (e.g., ME) implementing TP authentication mechanisms (e.g., PAVP) to the user. It also implements a secure channel to a service provider and implements a secure execution environment for managing user credentials (e.g. password). As a result, the SP can require TP 135 to enforce policies to quantify user attestation and authentication. For example, the SP can require an EPID from CPU 125, coupled with an OTP from TP module 135, to ensure a valid platform is communicating with the backend service of the SP. The SP can then require the end user to enter a valid PIN to unlock CV 140. In one embodiment, an EPID may be verified via an additional machine 185 (e.g., server) via channels 190, 195.

In block 346, the SP tests CV 140 for the user's authentication status. In block 348, if the user is not authenticated the process may return an error. However, if the user is authenticated then in block 350 it is determined whether SP has a dominant MFA policy (i.e., requires a factor other than and/or less stringent than those in the default MFA policy stored in CV 140). If yes, the method advances to block 356. Otherwise, in block 352 CV 140 prompts the user to authenticate, via a trusted path. Entry of such information may be input via graphic overlay capabilities (e.g., sprite 115) of TP module 135 so module 135 can securely present data to the user outside of software 110 executing on CPU 125. (The process may repeat, via block 354, until all factors are vetted. Once they are vetted block 350 may now lead to block 356.) Thus, TP module 135 can safely collect keyboard and/or mouse clicks. Once the end user unlocks CV 140, TP module 135 can re-authenticate to the SP using strong, unique, and long password. The factor authentication may repeat as needed according to the dominant policy.

In block 356 CV 140 updates the user status. In block 358 the user's credentials (for the SP) are released to the SP. This may allow an application (e.g., browser) that is opening a connection with a web server to supply it with the password. If the user has previously authenticated (e.g., at BIOS in block 318 or at OS login in block 328) then the user may not be re-prompted to authenticate. Rather the status is checked first at blocks 348 and 350. If status permits, then the password specific to the web service is "released" and replayed to the browser to complete the web login challenge.

In block 360 flow continues to the calling entity (e.g., browser) and the method ends.

Thus, various embodiments provide usability of multi-factor authentication with credentials that are available in pre-boot and post-boot environments so the user need not automatically re-authenticate during the transition between pre-boot and post-boot. Consequently, the user experience is improved due to, for example, reduced user fatigue/frustration associated with repeatedly inputting and/or keeping up with multiple authentication factors and strong passwords.

Also, as discussed above, the protection of end user authentication events is fostered based on trusted-path mechanisms implemented in the chipset/SOC and "uncore" hardware (e.g., functions of a microprocessor that are not in the core such as the ALU, FPU, L1 and L2 cache). The user authentication event and association with credentials is protected continuously thereby reducing the threat of a browser-in-the-middle attack that replays valid credentials even when the user has not been authenticated.

Also concerning trusted path mechanisms, in some embodiments attestation of authentication status is achieved using a credential vault and EPID integrated in the ME, thereby reducing the risk of identity theft (e.g., client-side malware masquerading as a legitimate user). There is also hardening of credential storage in the ME as credentials are not exposed to host memory or software executed on the CPU containing malware.

Also, automation and use of strong passwords is transparent to the user. Embodiments generate strong passwords that, in some embodiments, cannot be reused, thereby reducing risk of insider attack by a remote SP.

Figure 4:
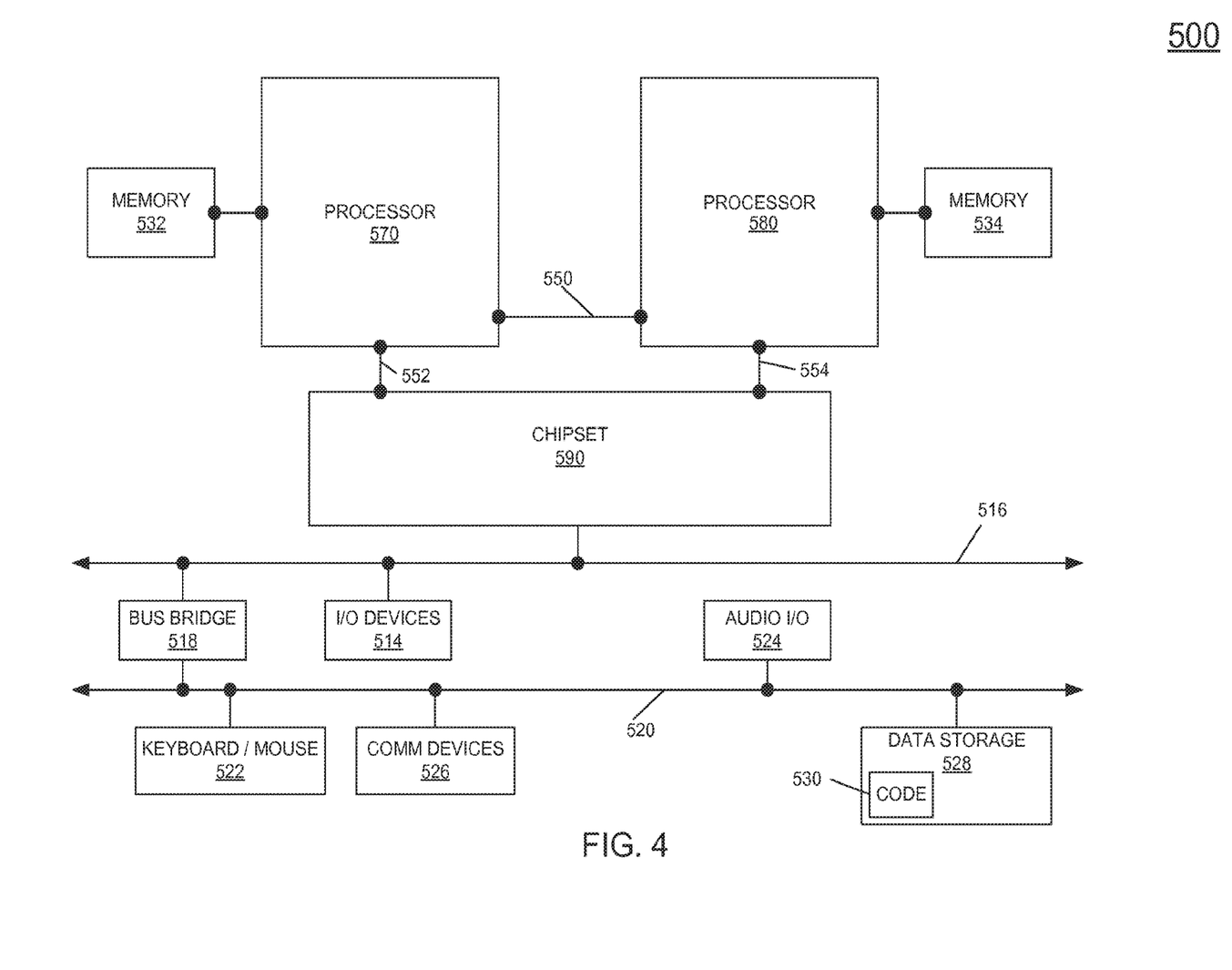
FIG. 4 includes a system for use with embodiments of the invention.

Embodiments may be implemented in many different system types. Referring now to FIG. 4, shown is a block diagram of a system in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors and may be included in processor 125, as further described in association with FIG. 1. The term "processor" may refer to any device or portion of a device that processes electronic data from registers and/or memory to transform that electronic data into other electronic data that may be stored in registers and/or memory. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces and may include elements SOC 130, ME or "security engine" 135, CV 140 as further described in association with FIG. 1. The security engine could be a sub-task of the ME, a secure execution mode of the ME, or a discrete micro-controller in the chipset. Chipset 590 may include static RAM and flash memory that is "off limits" to host OS 126 and is isolated from DMA access by the input/output (I/O) devices. Furthermore, chipset 590 may be coupled to a first bus 516 via an interface. Various I/O devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Further, an audio I/O 524 may be coupled to second bus 520.

Embodiments may be implemented in code and may be stored on a non-transitory storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Components or modules may be combined or separated as desired, and may be positioned in one or more portions of a device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An article comprising at least one non-transient machine-accessible storage medium having stored thereon instructions that when executed by a machine enable the machine to:
   authenticate a user to a processor-based host, via a third credential, to determine a user authentication status;
   authenticate the user to a processor-based first service provider via (a)(i) the user authentication status, (a)(ii) a first credential that is unequal to the third credential, and (a)(iii) a first out-of-band (OOB) communication;
   authenticate the user to a processor-based second service provider via (b)(i) the user authentication status, (b)(ii) a second credential that is unequal to either of the first and third credentials, and (b)(iii) a second OOB communication;
   in response to a timed-out session with the first service provider, re-authenticate the user to the first service provider without re-authenticating the user to the host.

2. The article of claim 1 including instructions that enable the machine to re-authenticate the user to the first service provider via another OOB communication.

3. The article of claim 2 including instructions that enable the machine to transparently re-authenticate the user to the first service provider via the another OOB communication.

4. The article of claim 2 wherein authenticating the user to a processor-based first service provider via the first OOB communication includes the first OOB communication bypassing an operating system (OS) of the machine.

5. The article of claim 4 including instructions that enable the machine to authenticate the user to the processor-based first service provider via the first OOB communication via a trusted path mechanism that is OOB with the OS.

6. The article of claim 5 wherein the trusted path mechanism includes a micro-controller implemented system to enforce policies received from a remote agent.

7. The article of claim 5 including instructions that enable the machine to store at least one of the first, second, or third credentials in the trusted path mechanism.

8. The article of claim 4 including instructions that enable the machine to authenticate the user to the processor-based first service provider via the first OOB communication via a credential vault that is OOB with the OS.

9. The article of claim 4 including instructions that enable the machine to generate at least one of the first or second credentials via the trusted path mechanism.

10. The article of claim 2, wherein authenticating the user to the host includes authenticating the user to a credential vault that is OOB with an operating system (OS) of the machine.

11. The article of claim 2 including instructions that enable the machine to communicate with the first and second service providers via in-band communications after authenticating the user to the first and second service providers via the respective first and second OOB communications.

12. The article of claim 2 including instructions that enable the machine to maintain the user authentication status locally in memory of the host.

13. The article of claim 2, wherein the first service provider is hosted by a first server, the second service provider is hosted by a second server, and the first server is not federated with the second server.

14. The article of claim 2 including instructions that enable the machine to:
   maintain the user authentication status locally on the host; and
   re-authenticate the user to the first service provider using the user authentication status maintained on the host.

15. A system comprising:
   a memory;
   a processor, coupled to the memory, to:
      authenticate a user to a processor-based host, via a third credential, to determine a user authentication status;
      authenticate the user to a processor-based first service provider via (a)(i) the user authentication status, (a)(ii) a first credential that is unequal to the third credential, and (a)(iii) a first out-of-band (OOB) communication;
      authenticate the user to a processor-based second service provider via (b)(i) the user authentication status, (b)(ii) a second credential that is unequal to either of the first and third credentials, and (b)(iii) a second OOB communication;
      in response to a timed-out session with the first service provider, re-authenticate the user to the first service provider without re-authenticating the user to the host.

16. The system of claim 15 wherein the processor is to re-authenticate the user to the first service provider via another OOB communication.

17. An article comprising at least one non-transient machine-accessible storage medium having stored thereon instructions that when executed by a machine enable the machine to:
   authenticate a user to a processor-based host, via a third credential, to determine a user authentication status;
   authenticate the user to a processor-based first service provider via (a)(i) the user authentication status, (a)(ii) a first credential that is unequal to the third credential, and (a)(iii) a first out-of-band (OOB) communication;
   authenticate the user to a processor-based second service provider via (b)(i) at least one of the user authentication status or an additional user authentication status, (b)(ii) a second credential that is unequal to either of the first and third credentials, and (b)(iii) a second OOB communication;
   in response to a timed-out session with the first service provider, re-authenticate the user to the first service provider without re-authenticating the user to the host;
   wherein the additional user authentication status is based on re-authenticating the user to the processor-based host via the third credential.

18. The article of claim 17 including instructions that enable the machine to re-authenticate the user to the first service provider via another OOB communication.

* * * * *